Figure 1:
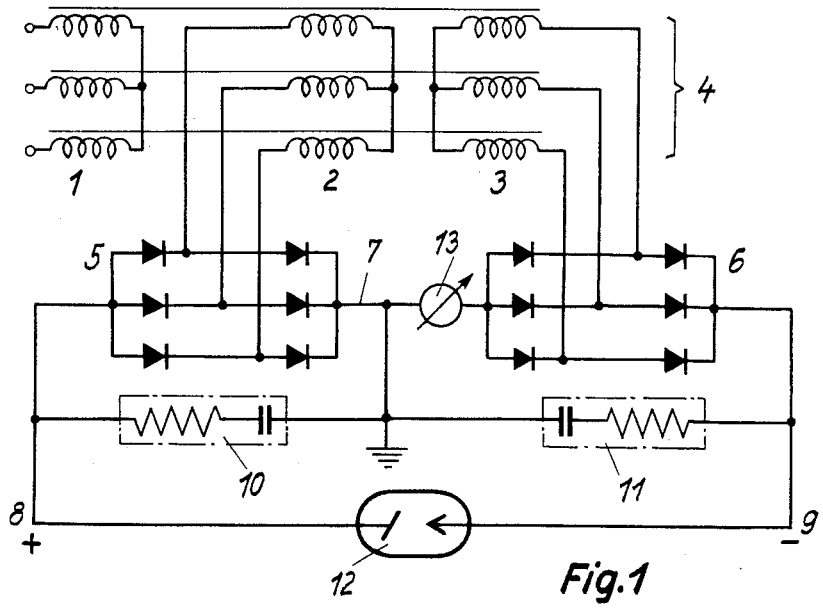

Inventors:
Heinz Schwesig, &
Kurt Bischoff.

United States Patent Office 2,999,970
Patented Sept. 12, 1961

2,999,970
CIRCUIT ARRANGEMENT FOR X-RAY APPARATUS PROVIDING FOR THREE-PHASE FULL WAVE RECTIFICATION OF ALTERNATING CURRENT
Heinz Schwesig and Kurt Bischoff, Erlangen, Germany, assignors to Siemens-Reiniger-Werke Aktiengesellschaft, Erlangen, Germany
Filed Aug. 8, 1956, Ser. No. 602,830
Claims priority, application Germany Aug. 16, 1955
4 Claims. (Cl. 321—27)

This invention is concerned with a circuit arrangement for X-ray apparatus providing for three-phase full wave rectification of three-phase current to obtain high voltage direct operating current.

In utilizing three-phase current full-wave rectification, each pole of the apparatus to be supplied with current is connected by way of a rectifier with each of the three poles of the three-phase currency source, the polarity of the rectifiers corresponding to the desired direction of current in the apparatus. Such an arrangement, feeding an X-ray tube and having the secondary windings of a three-phase current transformer star-connected is shown, for instance, in FIG. 1 of the U.S. Patent 2,676,296.

When it is intended to produce with the known three-phase rectifier circuit a direct voltage with a peak value of 125 kv., a terminal voltage of $125:\sqrt{3}=72$ kv. is required on each secondary winding. In the no-load or idling condition, the voltage at the X-ray tube will accordingly amount to 144 kv. because each of these poles remains loaded to 72 kv. in relation to the star point of the secondary windings. Therefore, the electrodes of the X-ray tube and the positive and negative current conductors for supplying current from the rectifier circuit to the X-ray tube must be insulated against each other for this no-load voltage of 144 kv., although the X-ray tube can be operated with a voltage of 125 kv. only.

It is an object of the invention to avoid the considerable increase of the no-load voltage in relation to the operating utilizable voltage occurring incident to the use of known three-phase full-wave rectifier circuits, thereby reducing the voltage stress on the individual parts of the apparatus supplied with current, including the current supply conductors, and making it possible to operate with the rectifier circuit apparatus requiring lower voltages.

This invention proceeds from recognition of the fact that the limitation to use a minimum number of rectifiers, posed in the case of ionic current valves for reasons of economy, can be avoided by using high-voltage dry rectifiers. In using dry rectifiers, the primary economic consideration is, to keep the total blocking potential at the rectifier system low, such voltage determining the number of rectifier elements required, that is, in the case of modern high-voltage dry rectifiers, the number of rectifier pellets. It will not require any particular expenditure to subdivide the rectifier pellet column corresponding to the total blocking potential, into a desired number of partial columns, each such partial column corresponding in its function to a rectifier.

The present invention is realized by the provision of a plurality of sets of circuit units each comprising the secondary winding and the three-phase full-wave rectifier arrangement, all units being fed in parallel on the input side and connected in series on the output side. The circuit arrangement according to the invention is obtained in a very simple manner by subdividing each of the three secondary windings of the three-phase current transformer, for instance, into two sections with equal number of turns, separately connecting together the sections of the three secondary windings corresponding to each other, in star- or delta connection, alloting a three-phase full wave rectifier arrangement to each of the two three-phase current circuits, and connecting the direct current output terminals of these two three-phase full-wave rectifier arrangements in series. Assuming an operating direct voltage of 125 kv., the no-load voltage will likewise amount to 125 kv. only.

The plural use of the above indicated circuit unit necessitates, of course, a corresponding multiplication of the number of rectifiers required; however, each of the rectifiers has to be dimensioned for a corresponding fraction of the voltage only. Therefore, in case of two units equipped with dry rectifiers, each rectifier need be only half as large as it had to be previously in case of one unit, so that merely an equal number of dry rectifiers as in the arrangement according to the known circuit is required for the circuit.

However, the advantage of the circuit arrangement according to the invention, resides not only in the lower voltage stress on the various parts, but also in the fact that it offers the possibility of reducing the pulsation factor or waviness of the operating voltage by connecting the secondary transformer windings star-fashion in one part of the units and delta-fashion in the other part thereof. The voltages on the individual windings are dephased by 30° in the delta connection in relation to the voltages on the interlinked windings in the start connection, whereby the pulsating voltages from the unit with delta connection come to lie with their peak values accurately halfway between the peak values of the voltage from the unit with start connection. The distance of the peak voltages which amounts to 60° each in two units in star- or delta connection, is reduced to 30° in two units one of which is connected in star connection while the other one is connected in delta connection.

A further advantage of the invention resides in the possibility even in case of neutral grounding of the high-voltage output side, of measuring the tube current at the grounding point, by inserting a milliammeter in the connecting line between the units.

Figure 2:
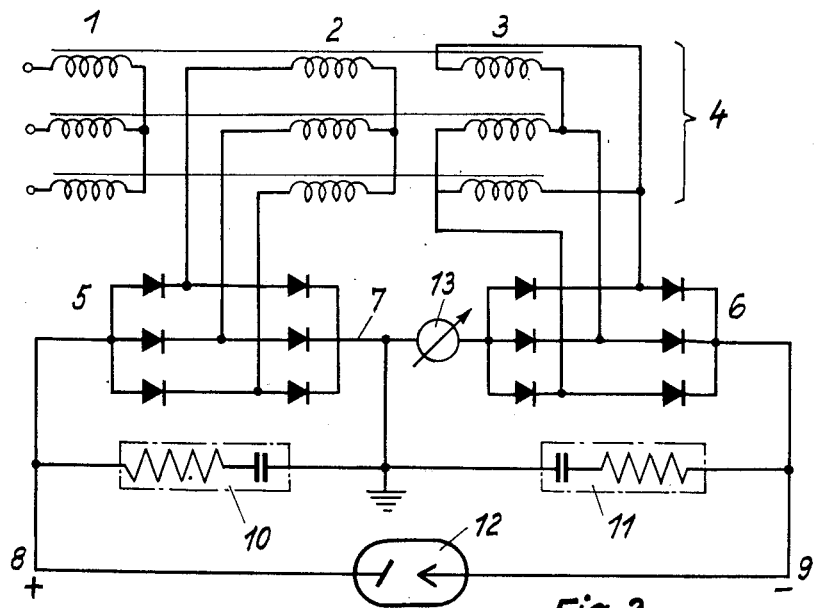

The foregoing and further objects, features and advantages of the invention will appear from the description of embodiments which will be rendered below with reference to the accompanying drawing, in which FIG. 1 is a circuit diagram showing one embodiment of the invention; and FIG. 2 is a circuit diagram showing another embodiment thereof.

The circuit arrangement comprises in each embodiment a three-phase current transformer 4 including three primary windings and three secondary windings each consisting of two secondary winding sections 2 and 3, grounded full-wave dry rectifier arrangements 5 and 6, a connection 7 between the two rectifier arrangements, positive (+) and negative (−) poles 8 and 9, smoothing means 10 and 11, an X-ray tube 12 and a milliammeter 13 for measuring the X-ray tube current.

It will be seen that each embodiment comprises two units which are connected in series on the continuous voltage side. In each case, each of the three secondary windings of a three-phase current transformer is subdivided in two sections 2 and 3. According to FIG. 1, the corresponding sections 2, 2, 2, or 3, 3, 3 are connected in star-fashion. According to FIG. 2, the sections 2, 2, 2 are connected together star-fashion while the sections 3, 3, 3 are connected delta-fashion.

Changes and modifications may be made within the spirit and scope of the appended claims.

We claim:
1. A three-phase high voltage generator with full wave rectification, for use in connection with X-ray apparatus, comprising primary winding means for each phase, an even number of secondary transformer windings for each phase, said windings being connected to form respective three phase winding groups, each of which contains a winding from each phase and produces three phase output voltages of identical magnitude, each winding group having a group of dry rectifier elements interconnected therewith in a three-phase full-wave rectification circuit, the direct-current outputs of the dry rectifier groups being connected in series with the opposite sides of the output of such series circuit being respectively allocated to the anode and cathode terminals of the X-ray tube and the symmetry point of the series circuit being grounded.

2. A three-phase high voltage generator according to claim 1, wherein each of the winding groups is connected in star circuit.

3. A three-phase high voltage generator according to claim 1, wherein one of the winding groups is connected in star circuit while the other winding group is connected in delta circuit, the number of turns in the partial windings of the winding groups being such that the output voltages between the phases of the two winding groups are of identical magnitude.

4. A three-phase high voltage generator according to claim 1, comprising a current meter for measuring the emisson current flowing through the X-ray tube, connected in the series circuit at the grounding point thereof.

References Cited in the file of this patent

UNITED STATES PATENTS

| | | |
|---|---|---|
| 1,655,636 | Smith | Jan. 10, 1928 |
| 2,340,098 | Zuhlke | Jan. 25, 1944 |
| 2,621,319 | Uhlmann | Dec. 9, 1952 |
| 2,676,296 | Kuntke | Apr. 20, 1954 |
| 2,748,292 | Worden | May 29, 1956 |
| 2,759,140 | Lewis | Aug. 14, 1956 |
| 2,813,243 | Christian et al. | Nov. 12, 1957 |
| 2,832,907 | McConnell | Apr. 29, 1958 |

FOREIGN PATENTS

| | | |
|---|---|---|
| 64,955 | France | Aug. 3, 1955 |